Aug. 10, 1965  R. A. PALMER  3,199,412
SERVOMECHANISM
Filed Sept. 25, 1962  2 Sheets-Sheet 2
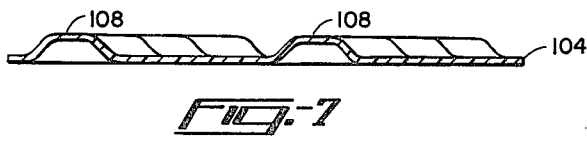
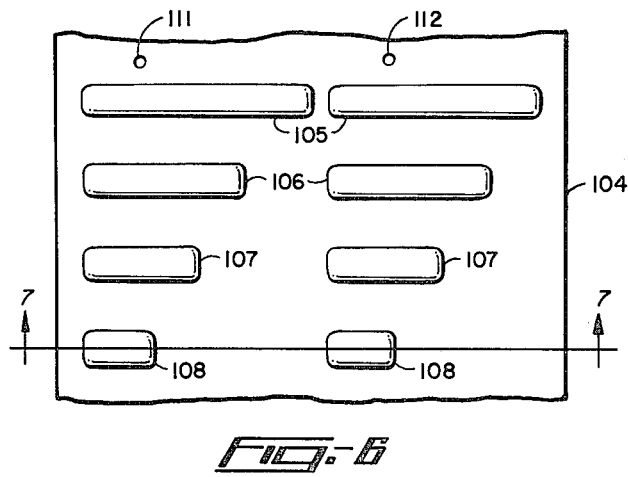
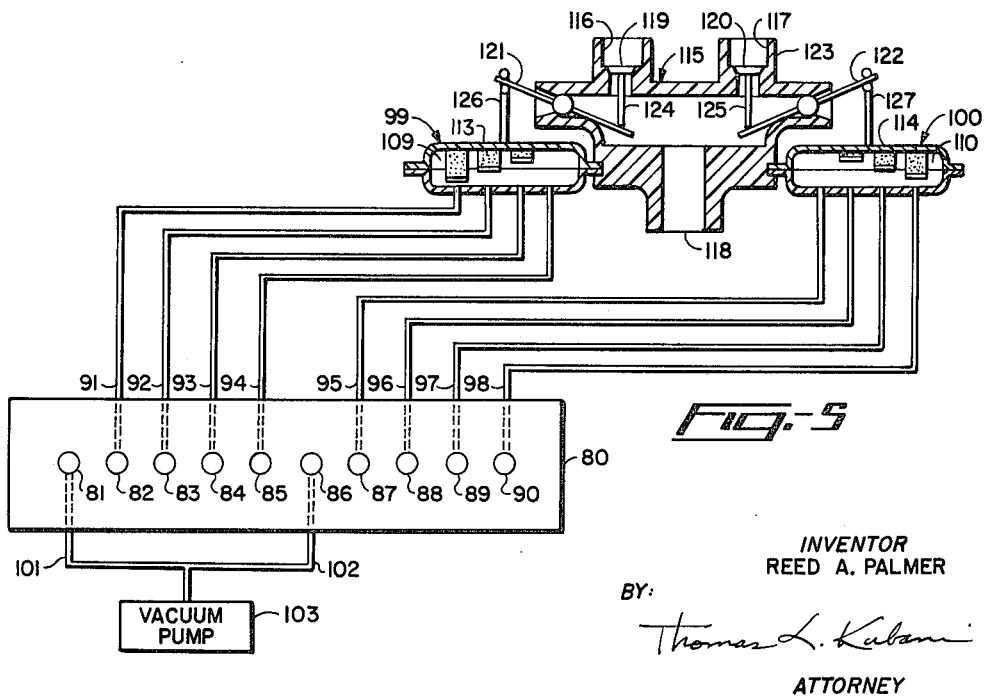
INVENTOR
REED A. PALMER
BY: *Thomas L. Kaban*
ATTORNEY

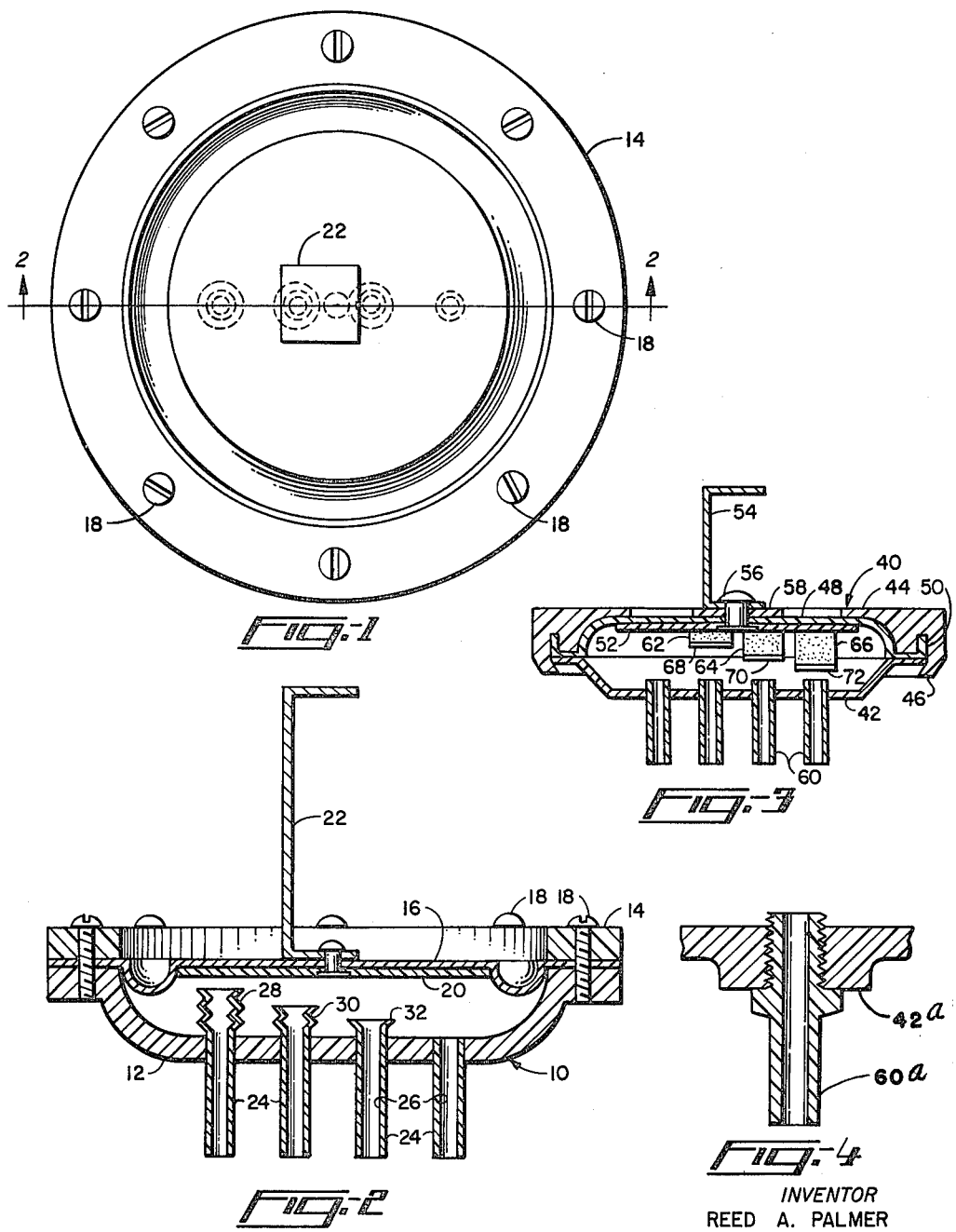

United States Patent Office 3,199,412
Patented Aug. 10, 1965

3,199,412
SERVOMECHANISM
Reed A. Palmer, Los Alamitos, Calif., assignor to Robertshaw Controls Company, Richmond, Va., a corporation of Delaware
Filed Sept. 25, 1962, Ser. No. 226,027
20 Claims. (Cl. 91—357)

This invention relates to servomechanisms for producing a controlled output motion in a series of steps, and has for its object, to produce a mechanical movement from pneumatic pulses.

In a pneumatic system, the servo motor includes a pneumatic motor, which converts pneumatic power to the mechanical power required in controlling the output motion of the servomechanism. Pneumatic servomechanisms are frequently used in applications involving the control of medium mechanical power level output motions because of their relatively small size, light weight, and fast response characteristics. Pneumatic controls are sometimes required in systems where the use of electricity is prohibitive because of fire or explosion hazards and they are designed to operate over a wide range of working temperatures.

The present invention is adaptable to the operation of an automatic washing machine controlled by sequential actuation of a plurality of control devices which are utilized to effect selective cycles of operation. A pneumatic flow is used to actuate the plurality of control devices with the flow controlled by a programmer device correlating the cycles of operation. The present invention is one of the components being actuated and which in turn translates the pneumatic flow into mechanical movement for operation of such things as the water mixer valve.

In practicing this invention, a flexible diaphragm is mounted within a housing having a plurality of inlets. Upon a pneumatic signal pulsed into one or more of the housing inlets, the diaphragm is deflected toward the inlet until it contacts a stop that seals the source of vacuum and prevents further deflection of the diaphragm. The diaphragm may be used for transmitting motion to another device.

One feature of the present invention is the use of flexible devices which can seal off vacuum flow and are mounted on either of the housing or the diaphragm. These devices are positioned over the inlets and are of various heights thereby allowing a limited movement of the diaphragm.

Additional features and advantages of the present invention will become apparent from the following description taken in connection with the accompanying drawings wherein:

FIGURE 1 is a plan view of a device embodying the present invention;

FIGURE 2 is a cross sectional view taken along line 2—2 of FIGURE 1 of a device embodying the present invention;

FIGURE 3 is a longitudinal cross sectional view of another embodiment of the present invention;

FIGURE 4 is a cross sectional view of an alternate construction of the vacuum inlet;

FIGURE 5 is a schematic diagram of a pneumatic flow circuit embodying the present invention for operating a mixer valve;

FIGURE 6 shows the program member;

FIGURE 7 shows the program member in a cut away view.

In the following description, the present invention will be correlated to the operation of a water mixer valve for a washing machine, however, it is to be understood that the invention is not limited to washing machines but may be utilized in many other devices where it is desired to use a pneumatic servomechanism for operating a component.

Referring now to FIGURES 1 and 2, one embodiment of the present invention is illustrated wherein the closure or housing 10 comprises a dish-shaped plate 12 and an annulus shaped clamping flange 14. A flexible partition or diaphragm 16 is mounted between the clamping flange 14 and plate 12 by a plurality of screws 18 or any suitable mechanical attaching devices. The diaphragm 16 may be of any particular shape or material to give the appropriate type of movement in conjunction with the amount of vacuum being subjected to it.

The stiffening disc 20 is mounted on the interior of the diaphragm 16 and a movement transmitting arm 22 is riveted therethrough and positioned on the opposite side of the diaphragm. This arm arrangement is used for convenience purposes to transpose the mechanical movement of the diaphragm to some other device. Therefore, other means of transmitting this motion into linear, radial, or circular motion may be used and are intended to be within the scope of the present invention.

A plurality of inlets 24 are formed on the plate 12 and protrude outwardly thereby providing communication to the interior of housing 10. The inlets are positioned opposite the disc 20 such that the openings 26 therein may be covered by the disc 20 upon downward movement of the diaphragm 16. The number of inlets corresponds to the number of positions or movements of the motion transmitting arm 22 and may be varied depending upon the choice of the number of movements. Positioned over all but one of the inlets 24, are a plurality of collapsible open ended bellows 28, 30 and 32. These bellows 28–32 are mounted coaxially on the inlets 24 such that they allow communication between the inlet and the interior of the housing. The inlets are generally parallel to each other and substantially transverse to the diaphragm 16 and disc 20. A bellows was used for purposes of providing an element which is easily collapsible to a relatively flat closed position. Other elements which are collapsible may be used, such as relatively thin tubing material or the like.

In operation, a source of vacuum is attached to one or more of the inlets thereby subjecting the interior of the housing 10 to a vacuum. Naturally, if one or more of the inlets are not connected to the vacuum source, those inlets must be sealed to prevent a loss of vacuum. As the diaphragm 16 moves downwardly toward the inlets 24, the bellows 28–32 will be contacted by the disc 20 thereby preventing vacuum flow and further downward movement of the diaphragm 16. It follows that the diaphragm 16 will move downward until it contacts the inlet attached to the vacuum source and having the shortest height of bellows 28–32 thereon. For example, if inlet 24 and bellows 32 were attached to the vacuum source and the remainder of the inlets were sealed, the diaphragm 16 would move downwardly until it contacted bellows 32. The remaining bellows 28 and 30 would compress under the movement of the diaphragm. Therefore, the choice of the inlet to be subjected to vacuum will determine the relative position of the diaphragm 16 and the motion transmitting arm 22. Upon exhaust of the vacuum, the diaphragm 16 flexes upwardly due to its own inherent resiliency and assumes a normal position as illustrated in FIGURE 2. Alternatively, diaphragm 16 may be biased by a spring (not shown) to force it to the position of FIGURE 2.

Referring now to FIGURE 3, another embodiment of the present invention is illustrated. The housing or closure 40 comprises a dish-shaped plate 42 retained within cup 44 by flange 46 crimped over its periphery. Disposed between the plate 42 and cup 44 is a diaphragm or flexible partition 48 having an enlarged portion at its periphery 50 for purposes of retaining it within the housing 40. The particular shape and flexibility of this diaphragm depends upon its application and the desired speed of the operation. A disc 52 is positioned on one side of the diaphragm and acts to stiffen the assembly and provides a place of assembly of the motion transmitting arm 54 positioned on the opposite side of the diaphragm 48. A rivet 56 passes through the arm 54, washer 58, and the diaphragm 48 and disc 52 assembly.

A plurality of inlets 60 are integrally formed on the plate 42 as discussed in relation to the embodiment illustrated in FIGURE 2.

A plurality of collapsible elements 62, 64 and 66 are mounted on the disc 52 opposite the inlets. These elements have a nonporous face 68, 70 and 72 attached thereto, such that downward movement of the diaphragm causes the elements to seal off the mouth of the inlets 60 when the interior of the housing 40 is subjected to a vacuum. The construction of the elements 62-66, may be from such things as a collapsible open cell foam or other equivalent material.

Referring now to FIGURE 4, the inlets 60a may be threaded into the plate 42a such that the height of the inlet may be varied relative to the interior of plate 42a.

Thus it may be seen that the operation of the embodiment illustrated in FIGURE 3 is almost exactly the same as discussed in relation to the embodiment illustrated in FIGURE 2. For instance, if a vacuum is subjected to one or more inlets 60, the diaphragm 48 will be drawn downwardly, collapsing the elements until it contacts the shortest element opposite an inlet connected to the vacuum source. The inlets not connected to the vacuum source must be sealed off to prevent vacuum leaks.

For more illustrative purposes, reference is now made to FIGURE 5 wherein the invention is applied to a practical application of a servomechanism operating a component in a system. One application of the present invention is a system which uses a reading head or block 80 having an upper surface interrupted by a plurality of switch passages 82-85 and 87-90, respectively interconnected to conduits 91-98 leading to vacuum operated servomechanisms 99 and 100.

The top or reading surface of the reading head 80 is also interrupted by a plurality of vacuum passages 81, 86 which are respectively connected to a vacuum source such as pump 103 via the conduits 101, 102. The vacuum pump 103 can be operated by any suitable electric motor as desired.

As shown in FIGURES 6 and 7, a thin flexible program sheet or card 104 is adapted to pass over the reading surface of the reading head 80 and has a plurality of indentations or blisters 105-108 formed therein which are adapted to successively, and in any desired pattern, span the spacing between the suction or vacuum passages 81 and 86, and one or more of the switch passages 82-85 and 87-90 to interconnect the vacuum source with one or both of the vacuum chambers 109, 110, within the servomechanisms 99, 100.

When it is desired to break the vacuum in one or both of the servomechanisms, the program sheet or card 104 has apertures 111, 112 formed therein which are adapted to pass over the switch passages in any desired relation, so that air can be drawn into the chambers 109, 110 within the particular servomechanisms to break the flow of vacuum thereto, and allow the diaphragms 113, 114 to assume a natural position.

The servomechanisms illustrated in FIGURE 5 are schematically shown to be the embodiment illustrated in FIGURE 3. The inlets have been respectively connected to the conduits 91-98 leading from the reading head 80 and therefore may be singly or multiply connected to the vacuum source 103.

A water mixer valve 115 is schematically illustrated and has therein a hot water inlet 116 and a cold water inlet 117 which are respectively connected to a hot water and cold water source. Details of a water mixer valve are shown in the application being Serial Number 143,144 and filed on October 5, 1961. Depending on the amount of water passing through the inlets 116, 117, the temperature of the water being emitted from the outlet 118 can be determined by the relative height of the respective valves 119, 120. A lever 121, 122, pivotally mounted on the mixer valve body 123 is in contact with the valve stem 124, 125 and may open the valve 119, 120 at any desired height. The extremity of the lever 121, 122, is attached to the movement transmitting arm 126, 127 of the respective servomechanism 99, 100, thereby it may be seen that depending upon the blisters 105-108, on the reading head 80 at any particular moment, the vacuum will be shunted from the vacuum source 103 through a particular conduit 91-98 into the servomechanism chamber 109-110. Therefore, the diaphragm 113, 114 and arm 126, 127, will be deflected downwardly to pivot the water mixer valve lever 121, 122 to open the hot or cold water valve 119, 120. Thus the temperature of the water emitted from the valve outlet 118 may be regulated by the particular combinations of conduits which are connected to the vacuum source.

The arrangement illustrated in FIGURE 5 is but one type of system which may be used, embodying the present invention to great advantage. This system is given by way of illustration and not of limitation as there are many different forms of apparatus which may be designed or devised according to the needs of the user.

Although specific embodiments of the invention have been shown and described, it will be understood of course, that it is only illustrative and that various modifications may be made therein without departing from the scope and spirit of this invention as defined in the appended claims.

I claim:

1. A servomechanism comprising a housing, a movable member carried by said housing and cooperating therewith to define a chamber in said housing, means defining a plurality of inlets in said housing, said inlets being interconnected with said chamber and facing a direction of movement of said movable member toward said inlets, one of said movable member and said housing carrying means of different lengths aligned with said inlets, and means for selectively interconnecting one of said inlets with a source of reduced fluid pressure whereby said movable member moves toward said inlets until said one inlet is closed by the cooperation of said movable member and the respective aligned means with said one inlet.

2. A servomechanism comprising a housing, a movable member carried by said housing and cooperating therewith to define a chamber in said housing, means defining a plurality of inlets in said housing, said inlets being interconnected with said chamber, one of said movable members and said housing carrying a plurality of resilient means of different lengths respectively aligned with said inlets, and means for selectively interconnecting one of said inlets with a source of reduced fluid pressure whereby said movable member moves toward said inlets until said one inlet is closed by the cooperation of said movable member and the respective resilient means with said one inlet.

3. A servomechanism as set forth in claim 2 wherein said movable member carries said resilient means.

4. A servomechanism as set forth in claim 3 wherein each resilient means includes a resilient block having a non-porous face.

5. A servomechanism as set forth in claim 2 wherein said housing carries said resilient means.

6. A servomechanism as set forth in claim 5 wherein each resilient means includes a tubular member.

7. A servomechanism as set forth in claim 2 wherein said movable member carries an actuating member.

8. A servomechanism as set forth in claim 2 wherein said inlets are disposed in aligned relation.

9. A servomechanism as set forth in claim 2 wherein at least one of said inlets is adjustable relative to said housing.

10. A servomechanism comprising a housing, a flexible diaphragm carried by said housing and co-operating therewith to define a chamber in said housing, means defining a plurality of inlets in said housing, said inlets being interconnected with said chamber and facing in a direction of movement of said diaphragm toward said inlets, one of said diaphragm and said housing carrying means of different lengths aligned with said inlets, and means for selectively interconnecting one of said inlets with a source of reduced fluid pressure whereby said diaphragm moves towards said inlets until said one inlet is closed by the cooperation of said diaphragm and the respective alinged means with said one inlet.

11. A servomechanism comprising a housing, a flexible diaphragm carried by said housing and co-operating therewith to define a chamber in said housing, means defining a plurality of inlets in said housing, said inlets being interconnected with said chamber, one of said diaphragm and said housing carrying a plurality of resilient means of different lengths respectively aligned with said inlets, and means for selectively interconnecting one of said inlets with a source of reduced fluid pressure whereby said diaphragm moves toward said inlets until said one inlet is closed by the cooperation of said diaphragm and the respective resilient means with said one inlet.

12. A servomechanism as set forth in claim 11 wherein said diaphragm carries said resilient means.

13. A servomechanism as set forth in claim 12 wherein each resilient means includes a resilient block having a non-porous face.

14. A servomechanism as set forth in claim 11 wherein said housing carries said resilient means.

15. A servomechanism as set forth in claim 14 wherein each resilient means includes a tubular member.

16. A servomechanism as set forth in claim 11 wherein said diaphragm carries an actuating member.

17. A servomechanism as set forth in claim 11 wherein said inlets are disposed in aligned relation.

18. A servomechanism as set forth in claim 11 wherein at least one of said inlets is adjustable relative to said housing.

19. A servomechanism comprising a housing, a movable member carried by said housing and cooperating therewith to define a chamber in said housing, means defining a plurality of inlets in said housing, said inlets being interconnected with said chamber, one of said movable member and said housing carrying a resilient means aligned with one of said inlets, and means for selectively interconnecting said one inlet with a source of reduced fluid pressure whereby said movable member moves toward said inlets until said one inlet is closed by the cooperation of said movable member and said resilient means with said one inlet, said last-named means being adapted to selectively interconnect said source with another of said inlets whereby said movable member moves toward said inlets and compresses said resilient means until said other inlet is closed by said movable member.

20. A servomechanism comprising a housing, a flexible diaphragm carried by said housing and cooperating therewith to defiine a chamber in said housing, means defining a plurality of inlets in said housing, said inlets being interconnected with said chamber, one of said flexible diaphragms and said housing carrying a resilient means aligned with one of said inlets, and means for selectively interconnecting said one inlet with a source of reduced fluid pressure whereby said flexible diaphragm moves toward said inlets until said one inlet is closed by the cooperation of said flexible diaphragm and said resilient means with said one inlet, said last-named means being adapted to selectively interconnect said source with another of said inlets whereby said flexible diaphragm moves toward said inlets and compresses said resilient means until said other inlet is closed by said flexible diaphragm.

References Cited by the Examiner

UNITED STATES PATENTS

| | | | |
|---|---|---|---|
| 2,896,124 | 5/61 | Allemann | 91—357 |
| 2,986,125 | 5/61 | Young | 91—357 |
| 3,068,849 | 12/62 | Thorner | 123—103 |
| 3,072,108 | 1/63 | Cripe | 91—395 |

FRED E. ENGELTHALER, *Primary Examiner.*

SAMUEL LEVINE, *Examiner.*